(12) United States Patent
Moffa

(10) Patent No.: US 10,002,324 B1
(45) Date of Patent: Jun. 19, 2018

(54) METHOD FOR DETERMINING DATA QUALITY IN A KNOWLEDGE MANAGEMENT SYSTEM

(75) Inventor: Jeffrey A. Moffa, Northville, MI (US)

(73) Assignee: Emergent Systems Corporation, Dearborn, MI (US)

( * ) Notice: Subject to any disclaimer, the term of this patent is extended or adjusted under 35 U.S.C. 154(b) by 0 days. days.

(21) Appl. No.: 12/262,456

(22) Filed: Oct. 31, 2008

(51) Int. Cl.
*G06F 19/00* (2018.01)
*G06N 5/02* (2006.01)

(52) U.S. Cl.
CPC ..................................... *G06N 5/02* (2013.01)

(58) Field of Classification Search
CPC ......... G06F 17/30067; G06F 17/30286; G06F 11/1435
USPC ........................................................ 707/687
See application file for complete search history.

(56) References Cited

U.S. PATENT DOCUMENTS

| | | | |
|---|---|---|---|
| 5,355,445 A | 10/1994 | Shibao et al. | |
| 5,809,493 A | 9/1998 | Ahamed et al. | |
| 6,353,767 B1 * | 3/2002 | Wakeman et al. | ............. 700/91 |
| 7,158,923 B1 | 1/2007 | Murthy et al. | |
| 2002/0138317 A1 | 9/2002 | Mok et al. | |
| 2002/0161765 A1 | 10/2002 | Kundrot et al. | |
| 2003/0061195 A1 * | 3/2003 | Laborde et al. | .................. 707/1 |
| 2005/0071135 A1 * | 3/2005 | Vredenburgh et al. | ........... 703/1 |
| 2005/0091191 A1 * | 4/2005 | Miller et al. | ...................... 707/1 |
| 2006/0020629 A1 | 1/2006 | Ramani et al. | |
| 2006/0025983 A1 | 2/2006 | Arbitter et al. | |
| 2006/0200556 A1 * | 9/2006 | Brave | .............. G06F 17/30867 709/224 |

* cited by examiner

*Primary Examiner* — Taelor Kim
(74) *Attorney, Agent, or Firm* — Young Basile Hanlon & MacFarlane, P.C.

(57) ABSTRACT

A method for calculating a confidence score for a data element that includes substantive technical data in a computer interpretable form and is adapted to be utilized by a knowledge management system. The method includes the steps of encoding substantive technical data in the data element, tracking a plurality of component factors for the data element, calculating a plurality of component scores for the data element wherein each individual component score corresponds to an individual component factor, and calculating the confidence score for the data element based at least in part on the plurality of component scores.

19 Claims, 5 Drawing Sheets

METHOD FOR DETERMINING DATA QUALITY IN A KNOWLEDGE MANAGEMENT SYSTEM

FIELD OF THE INVENTION

The present invention relates to the field of knowledge management systems, and more particularly, to calculating a confidence score for data elements in a knowledge management system.

BACKGROUND OF THE INVENTION

Although varied in scope and implementation, knowledge management systems generally intend to identify, codify, and distribute knowledge across an organization. In particular, knowledge management systems are typically computer implemented, database driven systems that store discrete elements of knowledge in a computer interpretable format so that the organization's knowledge can be refined and disseminated into various contexts as need arises. Typically, knowledge management systems utilize rules that control automation of calculations, comparisons, or other tasks. For example, a knowledge management system can be used to automate generation of product documentation, where the documentation is automatically updated when changes are made to the underlying data, such as design standards. Similarly, a knowledge management can be used to automate or assist certain aspects of product design.

By way of example, the field of knowledge-based engineering (KBE) integrates knowledge management systems with computer-aided design (CAD) and computer-aided engineering (CAE) systems. For example, knowledge that is codified in the knowledge management system may be applied to a three-dimensional model of a product to dynamically apply or change parameters that are utilized to define or alter aspects of the three-dimensional product model in the CAD system.

In order for the output provided by a knowledge management system to be useful, the knowledge codified in the knowledge management system must be relevant, accurate, complete, up-to-date, readily adapted to a variety of design tasks, and readily adopted by users. Quite simply, if the knowledge codified in the knowledge management system is of low quality, the knowledge management system will not be useful to its users, and those users will stop using the knowledge management system. However, the usefulness of the entire KBE system may be compromised if even a small number of knowledge elements in the knowledge management system are of low quality. Therefore, there is need for a method by which low quality knowledge elements may be identified automatically by the knowledge management system, and thus flagged for review or revision by the operators of the knowledge management system.

SUMMARY OF THE INVENTION

The invention provides a method for calculating a confidence score for a data element that includes substantive technical data in a computer interpretable form and is adapted to be utilized by a knowledge management system. The method includes the steps of encoding substantive technical data in a data element, tracking a plurality of component factors for the data element, calculating a plurality of component scores for the data element wherein each individual component score of the plurality of component scores corresponds to an individual component factor of the plurality of component factors, and calculating the confidence score for the data element based at least in part on the plurality of component scores.

The confidence score may be a heuristic measure of the accuracy of the substantive technical data contained in the data element. The substantive technical data may include at least one rule that correlates one or more input values to one or more output values.

In one embodiment, the step of tracking a plurality of component factors regarding the data element may further comprise tracking the frequency of usage of the data element as a usage based component factor of the component factors. In addition or alternatively, the step of tracking a plurality of component factors regarding the data element may further comprise tracking non conformance events attributable to the data element as a usage based component factor of the component factors.

In another embodiment, the step of tracking a plurality of component factors regarding the data element may further comprise tracking a user defined status indicator for the data element as a life cycle based component factor of the plurality of component factors. In addition or alternatively, the step of tracking a plurality of component factors regarding the data element may further comprise tracking the time elapsed since encoding or review of the data element as a life cycle based component factor of the component factors.

According to an additional embodiment, the method may further include the steps of assigning the data element to a peer group containing a plurality of analogous data elements, tracking at least one component factor for each data element of the plurality of analogous data elements, and calculating a population characteristic for the plurality of analogous data elements. The population characteristic is computed based on the component factor of each data element of the plurality of analogous data elements. In this embodiment, the step of calculating a plurality of component scores for the data element further includes calculating at least one of the individual component score of the plurality of component scores further based on the population characteristic for the plurality of analogous data elements.

BRIEF DESCRIPTION OF THE DRAWINGS

The description herein makes reference to the accompanying drawings wherein like referenced numerals refer to like parts throughout several views and wherein.

DETAILED DESCRIPTION OF THE PREFERRED EMBODIMENT

Figure 1:
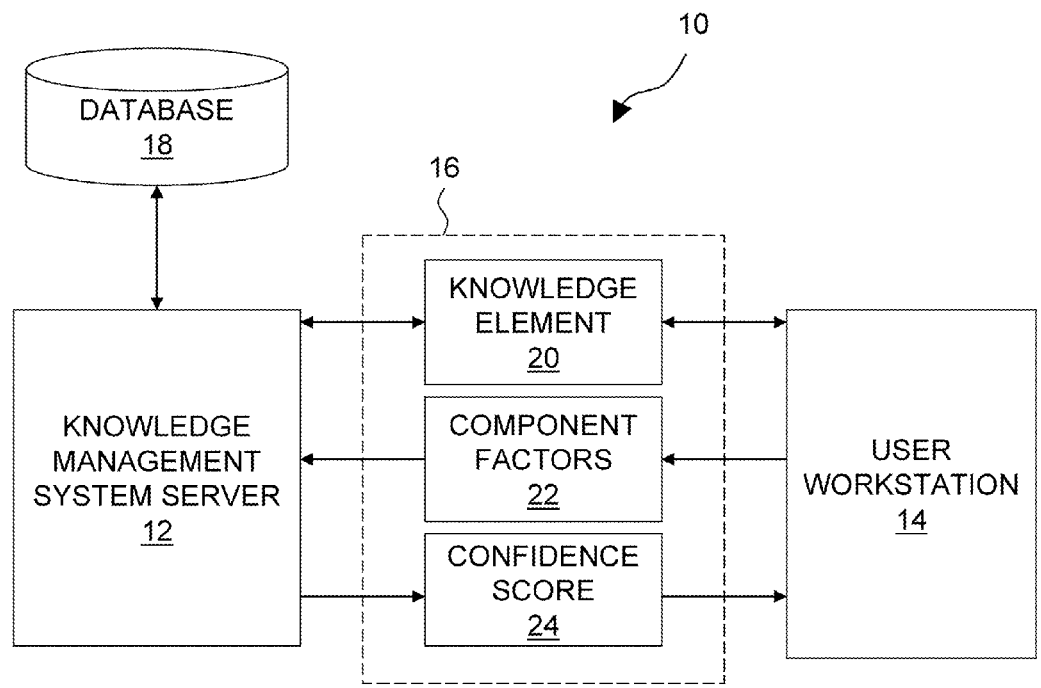
FIG. 1 is a block diagram showing a knowledge system that can be utilized to practice the method for determining data quality according to the present invention.

Referring to the drawings, the present invention will now be described in detail with reference to the disclosed embodiment.

As shown in FIG. 1, the invention provides a method for determining data quality that can be implemented using a knowledge system 10. The knowledge system 10 can include a knowledge management system server 12 that includes one or more computers that are adapted to perform the method of the invention, for example, by provision of appropriate software to the knowledge management system server 12. The knowledge management system server 12 can be connected to a user workstation 14 by a communications network 16, such as the internet, a local area network, or an analogous system for interconnecting remote computers for data transmission therebetween. To allow for storage and retrieval of data, the knowledge management system server 12 includes or is operatively connected to a database 18.

The knowledge management system server 12 provides a means for codifying the know-how of an expert into a computer interpretable form such as a knowledge element 20, which is also referred to herein as a data element. The knowledge management system server 12 receives the knowledge elements 20 from the user workstation 14 and stores the knowledge elements 20 in the database 18 for future use by the user workstation 14. When directed to do so by the user workstation 14, the knowledge management system server 12 retrieves one or more of the knowledge elements 20 from the database 18 and provides the knowledge elements 20 to the user workstation 14.

Figure 2:
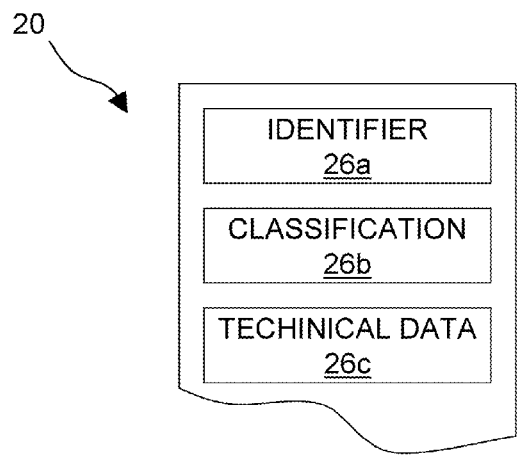
FIG. 2 is an illustration showing a knowledge element according to the method for determining data quality of the present invention.

Each knowledge element 20 may include several different types of data, which may be stored in the knowledge element 20 as database fields or in any other suitable fashion. For example, each knowledge element 20 could include an identifier 26a that allows the knowledge element 20 to be identified by the knowledge management system server 12, the user workstation 14, and by other knowledge elements 20, as shown in FIG. 2. The knowledge elements 20 could further include a classification 26b, which is information regarding the general type or category of information encoded in knowledge element 20, such that knowledge elements 20 may be identified as members of peer groups of analogous knowledge elements 20. The knowledge elements 20 also include, as the principal component thereof, technical data 26c, which represents the know-how that is encoded within the knowledge element 20. The technical data 26c may include parametric relationships, attributes, conditional relationships between values, mathematic expressions, or similar types of information. For example, the technical data 26c could be a rule or a set of rules that correlate input values to output values, where the input values and output values could be values, parameters, or expressions. Furthermore, the technical data 26c could describe a complex relationship between an input value and an output value that combines two or more of the previously mentioned classes of technical data 26c. In this manner, a number of knowledge elements 20 may be programmatically interrelated, interpreted, and applied by the knowledge management system server 12 and the user workstation 14 for utilization in conjunction with automated problem solving or design applications.

The user workstation 14 is equipped with software that allows the user workstation 14 to communication with the knowledge management system server 12 and consume the knowledge elements 20, wherein consumed means that the knowledge element 20 is interpreted by the user workstation 14 and applied in any desired manner. For example, the user workstation 14 could include document management software that dynamically generates documentation based on user defined criteria in combination with one or more knowledge elements 20. As another example, the user workstation 14 could include a knowledge based engineering software package that interfaces with a computer-aided design software package to automate design and drafting functions in light of the technical data 26c contained in one or more of the knowledge elements 20.

In order to track information regarding the life cycle and usage characteristics of each knowledge element 20, the knowledge management system server 12 is adapted to receive information regarding a plurality of component factors 22 from the user workstation 14. In particular, each time a knowledge element 20 is utilized by the user workstation 14, the user workstation 14 reports usage of that knowledge element 20 to the knowledge management system server 12 and also transmits any pertinent data regarding usage of the knowledge element 20 as a component factor 22. The component factors 22 are stored in the database 18 by the knowledge management system server 12 and are correlated to their corresponding knowledge elements 20 in the database 18.

Based on the component factors 22, the knowledge management system server 12 computes a confidence score 24 for each knowledge element 20. Generally stated, the confidence score 24 is a measure of the confidence of quality and usefulness of each knowledge element 20, such that a low confidence score 24 corresponds to low confidence in the quality and usefulness of the knowledge element 20, while a high confidence score 24 corresponds to a high level of confidence regarding the quality and usefulness of the knowledge element 20.

Figure 3:
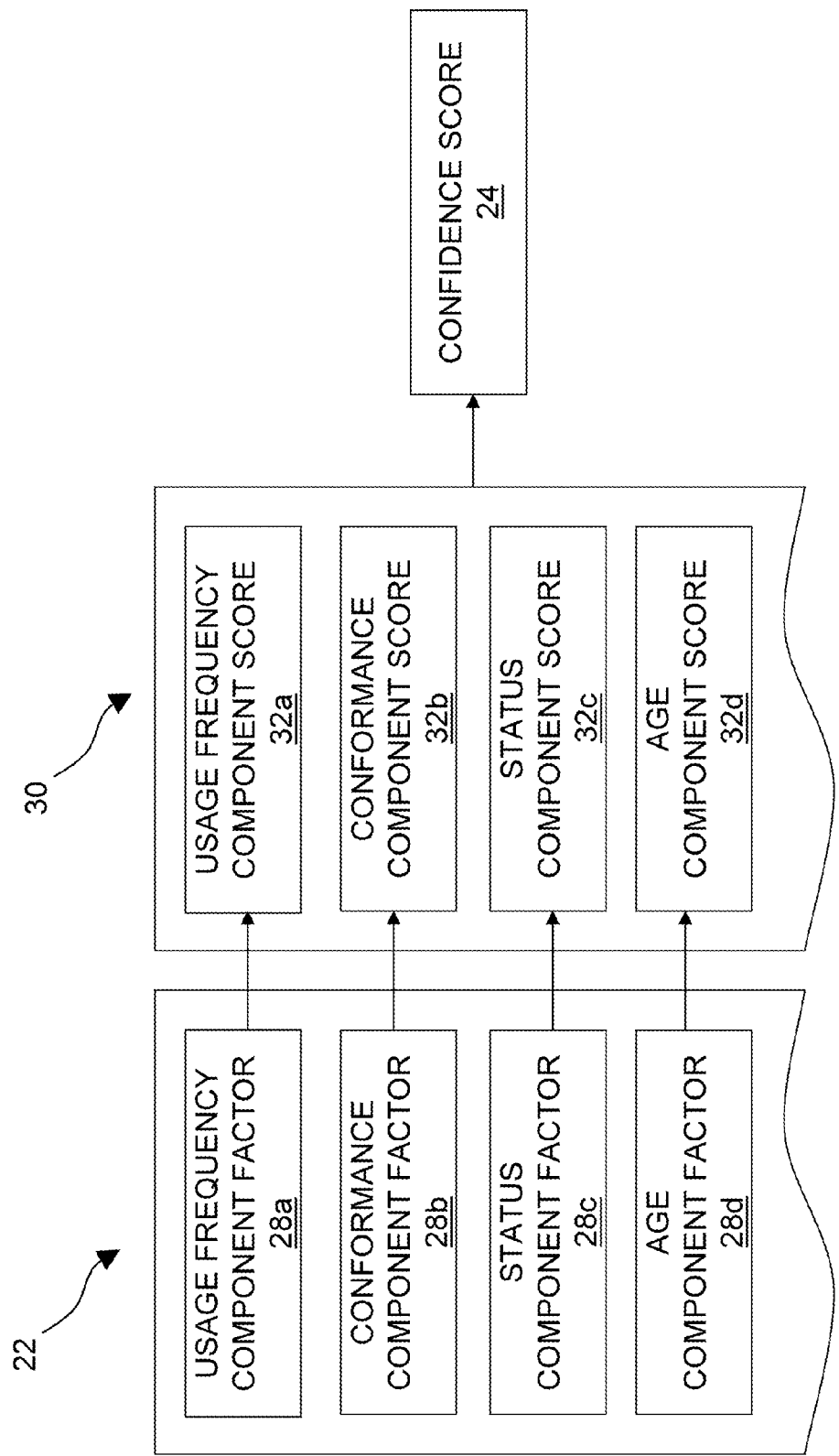
FIG. 3 is an illustration showing a relationship between a plurality of component factors, a plurality of component scores, and a confidence score according to the method for determining data quality of the present invention.

By computing the confidence score 24 on the basis of two or more component factors 22, the confidence score 24 can be used to represent the confidence of quality of the knowledge elements 22 as a function of usage based factors and life cycle based factors, as well as other factors that are probative of the quality of the knowledge elements 22. As shown in FIG. 3, the component factors 22 can include a usage frequency component factor 28a, a conformance component factor 28b, a status component factor 28c, and an age component factor 28d. The usage frequency component factor 28a and the conformance component factor 28b are examples of usage-based component factors 22. Usage-based component factors are specifically defined herein as component factors 22 that track data that arises as a result of usage of the knowledge element 20. The status component factor 28c and the age component factor 28d are examples of life-cycle based component factors. Life-cycle based component factors are specifically defined herein as component factors 22 that track data regarding the tendency of the knowledge elements to gain or lose validity or usefulness over time. The component factors 22 are used by the knowledge management system server 12 to calculate a plurality of component scores 30, including a usage frequency component score 32a, a conformance component score 32b, a status component score 32c, and an age component score 32d, and the confidence score 24 is calculated based on the component scores 30.

After computation of the confidence score 24, the user workstation 14 is operable to receive the confidence score 24 from the knowledge management system server 12, and present the confidence score 24 to the user of the user workstation 14 in the form of a report, an alert, or other suitable form. Of course, the most recently computed confidence score regarding a knowledge element 20 could be presented to the user by the user workstation 14 at any time, such as when the knowledge element is viewed, adopted, applied, or otherwise consumed by the user.

Figure 4:
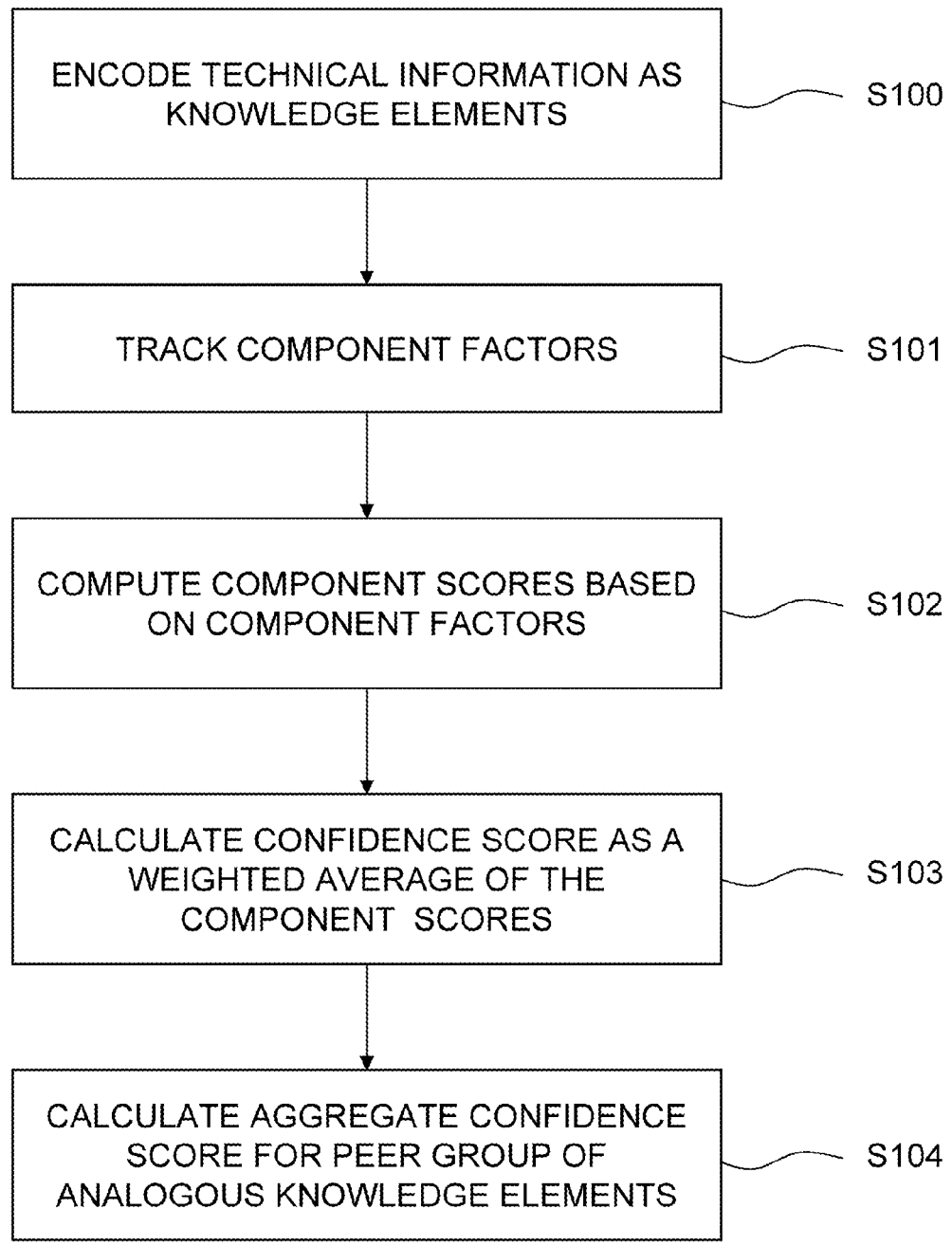
FIG. 4 is a flow chart showing the steps of the method for determining data quality of the present invention.

Computation of the confidence score 24 utilizing the method of the invention will now be explained with reference to FIG. 4. In step S100, the technical data 26c is encoded into the knowledge elements 20 using the user workstation 14. At this time, other data can also be encoded into the knowledge element 20, such as the identifier 26a or the classification 26b. The method then proceeds to step S101.

In step S101, the component factors 22 are tracked. Initially, life cycle based component factors 22, such as the status component factor 28b and the age component factor 28d may be tracked, for example, by storing the date of creation of the knowledge element 20 in the database 18 as the age component factor 28d to allow tracking of the age of the knowledge element 20. The date of the most recent review or modification of the knowledge element 20 could also be stored as the age component factor 28d. Tracking of the component factors 22 in step S101 continues constantly during usage of the knowledge element 20. For example, the frequency of usage of the knowledge element 20 is encoded as the usage frequency component factor 28a, and the frequency with which non-conforming outputs are attributable to the knowledge element 20 is tracked and stored in the database 18 as the conformance component factor 28b.

Periodically, the method proceeds to step S102, where the component scores 30 are calculated for each of the component factors 22, as will be explained in detail herein. The method then continues to step S103, where the confidence score 24 is calculated based on the component scores 30. For example the confidence score 24 can be calculated as a weighted average, wherein each of the component scores 30 is afforded a weight corresponding to the desired level of its influence over the confidence score 24.

Optionally, the method may proceed to step S104. In step S104, an aggregate confidence score may be calculated for a peer group of analogous knowledge elements 20. For example, the aggregate confidence score may be determined by averaging the confidence scores 24 for all of the knowledge elements 20 in the subject peer group of analogous knowledge elements 20.

Calculation of the component scores 30 will now be explained with reference to the usage frequency component score 32a, the conformance component score 32b, the status component score 32c, and the age component score 32d.

Figure 5:
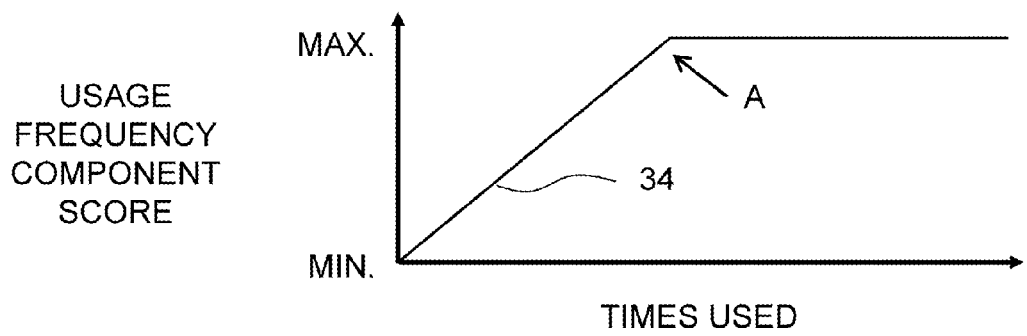
FIG. 5 is a graph showing an example of a function by which a usage frequency component score may be calculated.

As shown in FIG. 5, the usage frequency component score 32a can be calculated using a function 34 based on the number of times the knowledge element 20 is used, which is tracked as the usage frequency component factor 28a of the component factors 22. As the number of times that the knowledge element 20 is utilized increases, the usage frequency component score 32a increases from a minimum score to a maximum score. The usage frequency component score 32a increases in accordance with additional usage of the knowledge element 20, because data quality problems are expected to be detected when the knowledge element 20 undergoes a high frequency of usage. Thus, the usage frequency component score 32a can be calculated by any suitable function 34 that generally increases with increased usage of the knowledge element 20. For example, the usage frequency component score 32a could increase linearly from the minimum score to the maximum score until reaching the maximum score at an inflection point A in FIG. 5.

The usage frequency component score 32a could be calculated based on tracking the number of times that the knowledge element 20 has been used since it was encoded as the usage frequency component factor 28a. Alternatively, the usage frequency component score 32a could be calculated by tracking, as the usage frequency component factor 28a, usage of the knowledge element 20 within a temporal window of significance, such as the year prior to the date of the calculation. Furthermore, while the usage frequency component score 32a could be calculated by tracing the number of times the knowledge element 20 is used as the usage frequency component factor 28a, other methods could be utilized. For example, each usage of the knowledge element 20 could cause the usage frequency component factor 28a to be incremented by a number of points corresponding to the strength of the challenge to which the knowledge element 20 was applied. For example, the usage frequency component factor 28a could be incremented by a relatively small amount upon viewing of the technical data 26c contained in the knowledge element 20 by the user, while the usage frequency component factor 28a could be incremented by a larger amount when the knowledge element 20 is applied to solve a problem or control a portion of a product design, and the result of that activity is verified by the user. This reflects the relatively greater likelihood that application of the knowledge element 20 to a problem solving context will cause the user to identify and report poor quality of the technical data 26c in the knowledge element 20.

Figure 6:
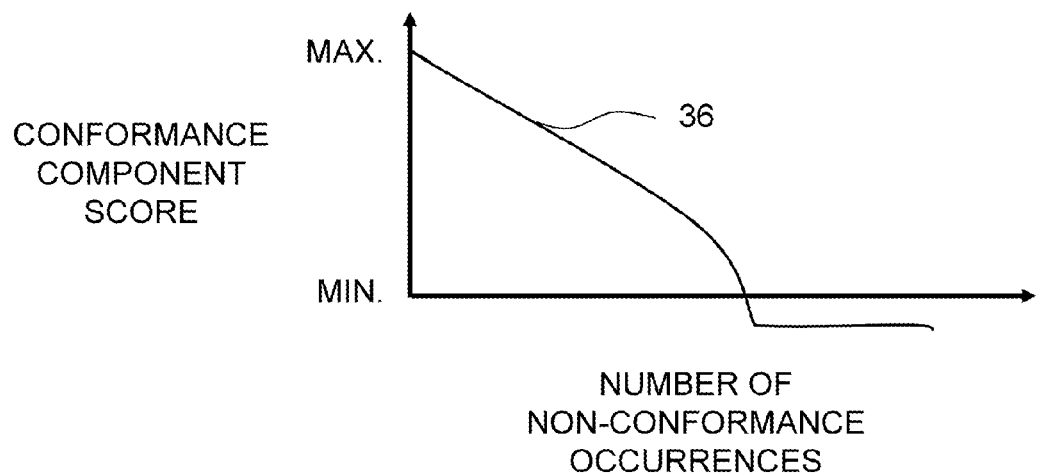
FIG. 6 is a graph showing an example of a function by which a conformance component score may be calculated.

As shown in FIG. 6, the conformance component score 32b may be calculated based on the number of non-conformance events that are attributable to the knowledge element 20 as the conformance component factor 28b of the component factors 22. In general, the conformance component score 32b is related to the conformance component factor 28b by a function 36 that decreases as the number of occurrences of non-conformance increase. After a certain number of non-conformance occurrences, the conformance component score 32b reaches a minimum value. For example, when the knowledge element 20 is consumed, the user may report the knowledge element 20 as non-conforming if the knowledge element 20 produces invalid results. Typically, a report of non-conformance indicates that the knowledge element 20 is invalid, at least under certain conditions. The function 36 relating the number conformance component factor 28b to the conformance component score 32b may be computed based in part on the conformance component factors 28b for all of the knowledge elements 20 in a peer group of analogous data elements 20. For example, the conformance component score 32b for the knowledge element 20 may be calculated with reference to the standard deviation of non-conformances among the peer group of analogous knowledge elements 20. Thus, the more anomalous the number of non-conformances for the knowledge element 20, the further the conformance component score 32b for the knowledge element 20 will depart from the maximum value of the conformance component score 32b.

Figure 7:
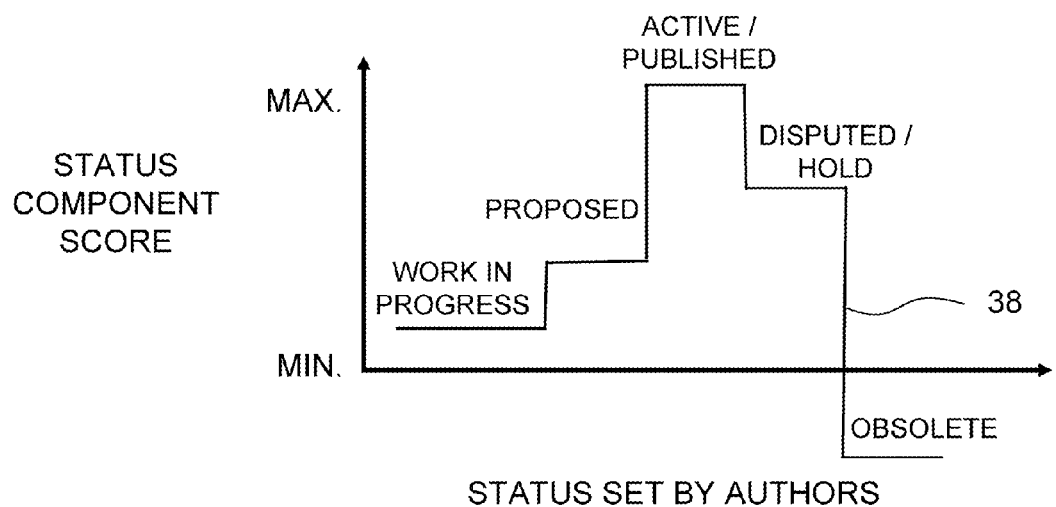
FIG. 7 is a graph showing an example of a function by which a status component score may be calculated.

As shown in FIG. 7, a status component score 32c is calculated based on a user defined status indicator that is set by the author or other user of the knowledge element 20, and which is tracked as the status component factor 28c. For example, the status component score 32c may be related to the user defined status of the knowledge element 20 by a step function 38, wherein each step of the function corresponds to a different status. For example, a relatively low score may be assigned to a knowledge element 20 having a status of "work-in-progress", while a slightly higher score may be given to a knowledge element 20 having a status of "proposed." Once the knowledge element 20 has been given a status such as "active," it can be attributed a maximum status component score 32c. If the status subsequently changes to "disputed" or "hold," a lower status component score 32c may be assigned. In the case that the knowledge element 20 becomes obsolete, the status component score 32c may be set to the minimum value. Calculation of the status component score 32c reflects the likelihood that a mature knowledge element 20 will generally be of higher quality than a work in progress or proposed knowledge element 20. Furthermore, the status component score 32c allows for assessment of the quality of the knowledge element 20 by the user of the knowledge system 10. Although the status component score 32c is shown and described herein as being related to the status component factor 28c by the step function 36, it should be understood that the status component score 32c could be modeled in other ways. For example, the status component score 32c could be modeled as a combination of the status component factor 28c and another component factor 22 describing the amount of time that has elapsed since the current status was designated.

Figure 8:
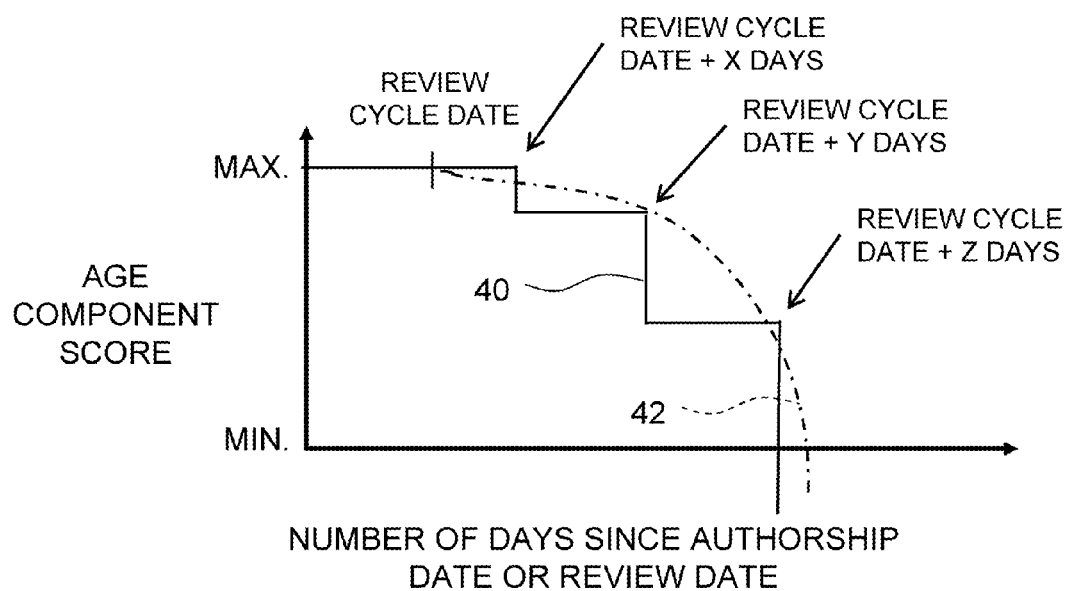
FIG. 8 is a graph showing a function by which an age component score may be calculated.

As shown in FIG. 8, the age component score 32d is based on the age component factor 28d. For example, the organization using the knowledge system 10 may designate a certain number of days after encoding or review of a knowledge element 20, at which time the knowledge element 20 is to be reviewed again. If the specified number of days have not elapsed since encoding or review, the knowledge element 20 is given a maximum age component score 32d. After the specified review cycle date has passed, the age component score 32d for the knowledge element 20 may decrease based on the number of days that have elapsed since the review cycle date has lapsed. This may be modeled as a step function 40, a linear function (not shown), or a curvilinear function 42. As addition time passes since the review cycle date, the age component score 32d approaches a minimum value. The age component score 22 reflects the general understanding that usefulness and validity of technical data 26c that is encoded into a knowledge element 20 may change over time. Thus, by enforcing a review cycle, the continued validity and usefulness of the knowledge element 20 may be confirmed. Furthermore, the review cycle date or the function 40, 42 correlating the age component factor 28d to the age component score 32d may be specific to a peer group of analogous knowledge elements 20.

In operation the user of the knowledge system 10 consumes knowledge elements 20 using the user workstation 14 either manually or using software that consumes the knowledge elements 20. Concurrently, the knowledge management system server 12 tracks the component factors 22 and calculates the confidence score 24 for each knowledge element 20. The confidence score 24 may then be reported to the user via the user workstation 14.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A method, comprising:
receiving and storing a data element having technical data encoded therein, by transmission of the data element over a communications network to a server computer, wherein the data element is computer interpretable and adapted to be utilized by a knowledge management system;
transmitting the data element, by transmission of the data element over the communications network from the server computer, in response to requests for the data element;
storing a plurality of component factor values regarding the data element subsequent to receiving and storing the data element, the component factor values each relating to an accuracy of the technical data that is encoded within the data element;
calculating a confidence score representing the accuracy of the technical data encoded in the data element based on the plurality of component factor values; and
transmitting the confidence score, by transmission of the confidence score over the communications network from the server computer.

2. The method of claim 1, wherein the technical data that is encoded in the data element includes at least one rule that correlates one or more input values to one or more output values.

3. The method of claim 1, wherein the technical data that is encoded in the data element codifies the know how of an expert into a computer interpretable form.

4. The method of claim 1, wherein the technical data that is encoded in the data element includes a parametric relationship.

5. The method of claim 1, wherein the technical data that is encoded in the data element includes a conditional relationship between values.

6. The method of claim 1, wherein the technical data that is encoded in the data element includes a mathematic expression.

7. The method of claim 1, wherein the data element is adapted to be interpreted and applied by an automated design application.

8. The method of claim 1, further comprising:
receiving usage reports regarding the data element, by transmission of the usage reports over the communications network to the server computer, the usage reports including data regarding usage of data element, wherein the usage reports are stored as a usage based component factor value of the plurality of component factor values.

9. The method of claim 1, further comprising:
receiving usage reports regarding the data element each time the data element is used, by transmission of each usage report over the communications network to the server computer; and
determining a number of usages of the data element based on the usage reports as a usage based component factor value of the plurality of component factor values.

10. The method of claim 9, wherein the confidence score increases as the number of usages of the of the data element increases.

11. The method of claim 1, further comprising:
receiving usage reports regarding the data element each time the data element is used, by transmission of each usage report over the communications network to the server computer, the usage report indicating whether usage of the data element produced a conforming result or a non-conforming result; and determining a number of number of conforming results and a number of non-conforming results of the data element based on the usage reports as a usage based component factor value of the plurality of component factor values.

12. The method of claim 1, further comprising:

receiving a user-defined status indicator, by transmission of the user defined status indicator over the communications network to the server computer; and storing the user defined status indicator as a status component factor value of the plurality of component factor values.

13. The method of claim 1, further comprising:

storing a time elapsed since receiving and storing of the data element as a life cycle based component factor value of the plurality of component factor values.

14. The method of claim 1, further comprising:

storing a time elapsed since modification of the data element as a life cycle based component factor value of the plurality of component factor values.

15. The method of claim 1, further comprising:

storing a time elapsed since review of the data element as a life cycle based component factor value of the plurality of component factor values.

16. The method of claim 1, further comprising:

assigning the data element to a peer group containing a plurality of analogous data elements; and calculating a population characteristic for the plurality of analogous data elements, wherein in the step of calculating a confidence score is based at least in part on a comparison of at least one of the component factor values regarding the data element to the population characteristic.

17. The method of claim 1, wherein the confidence score is transmitted along with the data element in response to a request for the data element.

18. A method, comprising:

storing, at a server computer, a data element having technical data encoded therein, wherein the data element is computer interpretable and adapted to be utilized by at least one remote computer for performing of at least one computer-aided design function at the at least one remote computer;

receiving, at the server computer, requests for the data element from the at least one remote computer, wherein the requests for the data element are transmitted from the at least one remote computer to the server computer over a communications network;

transmitting the data element over the communications network from the server computer to the at least one remote computer, in response to the requests for the data element;

receiving usage reports regarding the data element each time the data element is used, by transmission of each usage report over the communications network to the server computer, the usage report indicating whether usage of the data element produced a conforming result or a non-conforming result;

determining a number of number of conforming results produced by the data element based on the usage reports;

determining a number of non-conforming results produced by the data element based on the usage reports; and calculating a confidence score representing an accuracy of the technical data encoded in the data element based at least in part on the number of number of conforming results and the number of non-conforming results; and transmitting the confidence score over the communications network from the server computer to the at least one remote computer.

19. A method, comprising:

storing, at a server computer, a data element having technical data encoded therein, wherein the data element is computer interpretable and adapted to be utilized by at least one remote computer for performing of at least one computer-aided design function at the at least one remote computer;

receiving, at the server computer, requests for the data element from the at least one remote computer, wherein the requests for the data element are transmitted from the at least one remote computer to the server computer over a communications network;

transmitting the data element over the communications network from the server computer to the at least one remote computer, in response to the requests for the data element;

receiving usage reports at the server computer from the at least one remote computer over the communications network, the usage reports regarding usage of the data element at the at least one remote computer;

calculating a confidence score representing an accuracy of the technical data encoded in the data element based at least in part on the usage reports; and transmitting the confidence score over the communications network from the server computer to the at least one remote computer.

* * * * *

UNITED STATES PATENT AND TRADEMARK OFFICE
CERTIFICATE OF CORRECTION

| | | |
|---|---|---|
| PATENT NO. | : 10,002,324 B1 | Page 1 of 1 |
| APPLICATION NO. | : 12/262456 | |
| DATED | : June 19, 2018 | |
| INVENTOR(S) | : Jeffrey A. Moffa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this
Eighteenth Day of December, 2018

Andrei Iancu
*Director of the United States Patent and Trademark Office*